Oct. 4, 1966  O. S. HALBOSTAD ETAL  3,276,537
SOUND-ABSORBING CEILING WITH INTERCHANGEABLE PANELS
FOR ABSORBING DIFFERENT FREQUENCIES
Filed Sept. 8, 1965

☐ LOW-FREQUENCY PANEL

☒ HIGH-FREQENCY PANEL

◯ WIDE-BAND FREQENCY PANEL

INVENTORS.

ODDVAR S. HALBOSTAD
GUNNAR ARNESEN

BY Kurt Kelman
Agent

United States Patent Office 3,276,537
Patented Oct. 4, 1966

3,276,537
SOUND-ABSORBING CEILING WITH INTER-
CHANGEABLE PANELS FOR ABSORBING
DIFFERENT FREQUENCIES
Oddvar S. Halbostad, Skoyenasveien 21, Bryn, Norway,
and Gunnar Arnesen, Bygdoylund 39, Bygdoy, Norway
Filed Sept. 8, 1965, Ser. No. 485,816
Claims priority, application Norway, Aug. 10, 1962,
145,386
3 Claims. (Cl. 181—30)

This is a continuation-in-part of our copending application Serial No. 301,191, filed August 9, 1963, now abandoned.

The present invention relates to a suspended ceiling in which three sets of acoustical panels are so combined as to control the acoustics of a room, all panels of the ceiling being made of the same sheet metal and having equal dimensions.

It is a primary object of this invention to enable the construction of ceilings of this type with "standard" panels simply modified to provide respective sound absorption in the high-frequency range, the low-frequency range and a wide band of sound wave frequencies. In such ceilings, all panels look substantially alike and individual panels may be readily replaced by other panels of like appearance but having different acoustic properties. In this manner, it is very simple to adjust the acoustics of a room according to differing conditions.

The above and other objects are accomplished by providing three sets of detachably suspended, abutting and coplanar sheet metal panels of the same sheet metal and equal dimensions. The high-frequency sound absorbing set of panels has evenly distributed perforations and is lined with a layer of porous sound absorbing material. The low-frequency sound absorbing set of panels is imperforate and is lined with a vibration damping material. The set of panels absorbing sound waves in a wide band of frequencies has evenly distributed perforations, is lined with a vibration damping material and has a layer of porous sound absorbing material arranged over the vibration damping material.

The thickness of the sheet metal of the panels preferably does not exceed about 0.04".

The porous sound absorbing material may be any conventional material used for this purpose, such as mineral wool.

As used herein, the term "vibration damping material" designates conventional materials used for damping vibrations, such as polymeric binders having inorganic fillers distributed therethrough. The binders may be synthetic resins, such as polyesters or epoxy resins, containing suitable curing agents. The fillers may be, for instance, vermiculite, aluminum flakes or mica. When used conventionally as vibration dampers, such materials must have a thickness at least equal to, and up to twice, the thickness of the sheet to which they are applied to damp vibrations of the sheet. However, as used throughout the specification and the claims, the term "vibration damping material" designates a layer of a thickness less than that of the sheet metal of the panels, preferably a coating of a thickness of about 0.02". A suitable material for such a coating is "Aquaplex."

With three sets of acoustical panels of the indicated types, it is possible to obtain any desired sound absorption coefficient throughout the entire sound frequency band.

The "pan" 1 is generally conventional for use as a ceiling panel in suspended ceilings and is stamped out of sheet metal. As shown, it comprises end flanges 2, 2 and grooved side flanges 3, 3 to enable the panels to be suspended in any desired manner, such as shown, for instance, in U.S. Patent No. 3,049,204 or in our copending application Serial No. 285,255, filed June 4, 1963. However, the suspension system forms no part of the present invention and such systems being well known per se, it is not further described herein. Identical pans are used in accordance with this invention for all panels of the ceiling, as schematically shown in FIG. 5, some of the panels being used without modification and others being modified in the manner shown in FIGS. 2 to 4 to obtain various acoustical characteristics.

Figure 1:
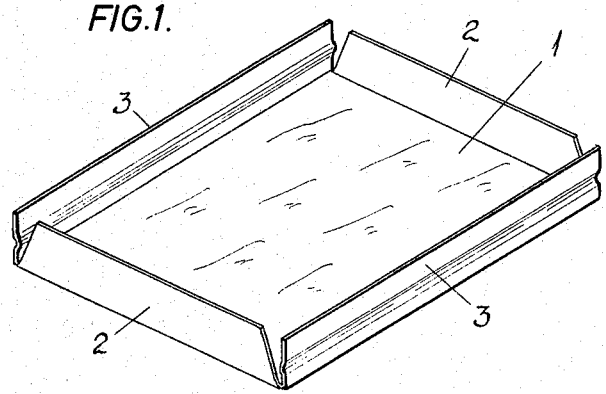
FIG. 1 is a persepctive view of an acoustical sheet metal pan useful for the panels of the present invention.
Figure 2:
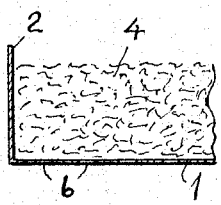
FIGS. 2, 3 and 4 are partial sectional views respectively showing the three types of panels of this invention.

FIG. 2 shows a high-frequency sound absorbing panel of a generally known structure. The bottom of this panel has evenly distributed perforations 6 the total area of which is at least about 10% of the entire area of the panel bottom but preferably covers a considerably larger area. The perforated bottom is lined with a layer or pad 4 of sound absorbing material, such as mineral wool.

The larger the area perforations and the thicker the layer of sound absorbing material, the greater the absorption of sound in the high-frequency band.

Figure 3:
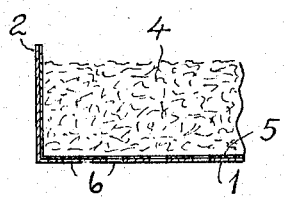

The wide-band sound absorbing panel of this invention is shown in FIG. 3. This panel is generally identical with that of FIG. 2, except that a vibration damping material 5 lines the panel, the sound absorbing layer being arranged over the vibration absorbing material. As illustrated, the thickness of the vibration damping material is no more than about half that of the sheet metal of panel 1.

Figure 4:
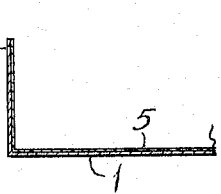
Figure 5:
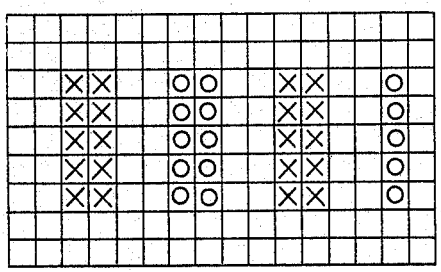
FIG. 5 is a schematic plan view of a ceiling comprising the three sets of panels.

FIG. 4 illustrates the low-frequency sound absorbing panel which is imperforate and lined with the vibration damping material 5 described hereinabove.

As is known, sound waves striking a flexible sheet, such as panel 1, cause the sheet to vibrate and the resulting flexing of the sheet dissipates a certain amount of the incident sound energy by converting it into heat, this energy absorption being often considerable, particularly at low frequencies. The thin coating of vibration damping material used in accordance with the invention further increases the sound energy absorptivity of the panel. It may be applied to the panel walls by spraying or brushing. If the binder is a hardenable synthetic resin, a curing agent is admixed thereto so that the coating will be bonded to the panel after it has set.

The quantity of granular of particulate filler used with the binder is such that the rubbing of the filler particles against each other during vibration will increase the dissipation of sound energy.

While the invention has been described in connection with certain preferred embodiments, it will be clearly understood that many variations and modifications may occur to the skilled in the art without departing from the spirit and scope of the invention as defined in the appended claims.

What we claim is:

1. A suspended, sound-absorbing ceiling comprising three sets of detachably suspended, abutting and coplanar sheet metal panels, all of the panels being of the same sheet metal and having equal dimensions, one of the sets consisting of panel absorbing high-frequency sound, the panels of the one set having evenly distributed perforations and being lined with a layer of a porous sound absorbing material, a second one of the sets consisting of panels absorbing low-frequency sound, the panels of the second set being imperforate and lined with a vibration damping material, and a third one of the sets consisting of panels absorbing a wide band of sound wave frequencies, the panels of the third set having evenly distributed perforations and being lined with a vibration damping material, and a layer of porous sound absorbing material being arranged over the vibration damping material lining the panels of the third set, the thickness of the vibration damping material in the panels in the second and third sets being less than that of the sheet metal.

2. The ceiling of claim 1, wherein the vibration damping material is a mixture of a polymeric binder and a particulate filler.

3. The ceiling of claim 1, wherein the sheet metal has a thickness of the order of 0.04 inch and the vibration damping material has a thickness of the order of 0.02 inch.

References Cited by the Examiner

UNITED STATES PATENTS

| | | | |
|---|---|---|---|
| 3,049,204 | 8/1962 | Sorenson | 181—33 |
| 3,087,574 | 4/1963 | Watters | 181—33 |

FOREIGN PATENTS

| | | |
|---|---|---|
| 448,950 | 6/1936 | Great Britain. |

RICHARD B. WILKINSON, *Primary Examiner.*